(12) United States Patent
S et al.

(10) Patent No.: US 8,112,663 B2
(45) Date of Patent: Feb. 7, 2012

(54) METHOD TO ESTABLISH REDUNDANCY AND FAULT TOLERANCE BETTER THAN RAID LEVEL 6 WITHOUT USING PARITY

(75) Inventors: Pavan P S, Bangalore (IN); Vivek Prakash, Bangalore (IN); Mahmoud K. Jibbe, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/732,841

(22) Filed: Mar. 26, 2010

(65) Prior Publication Data

US 2011/0239042 A1    Sep. 29, 2011

(51) Int. Cl.
*G06F 11/00* (2006.01)
(52) U.S. Cl. .................. 714/6.24; 714/6.2; 714/6.22
(58) Field of Classification Search .............. 714/6.1, 714/6.2, 6.21, 6.22, 6.23, 6.24, 6.32, 42, 714/54
See application file for complete search history.

(56) References Cited

U.S. PATENT DOCUMENTS

| | | | |
|---|---|---|---|
| 5,757,642 A | 5/1998 | Jones | 364/134 |
| 5,812,754 A | 9/1998 | Lui et al. | 395/182.04 |
| 6,079,029 A | 6/2000 | Iwatani et al. | 714/6 |
| 6,098,128 A | 8/2000 | Velez-McCaskey et al. | 710/65 |
| 6,151,659 A | 11/2000 | Solomon et al. | 711/114 |
| 6,170,037 B1 * | 1/2001 | Blumenau | 711/114 |
| 6,192,027 B1 | 2/2001 | El-Batal | 370/222 |
| 6,442,659 B1 | 8/2002 | Blumenau | 711/162 |
| 6,678,768 B1 | 1/2004 | Craft | 710/100 |
| 6,795,895 B2 | 9/2004 | Merkey et al. | 711/114 |
| 6,978,346 B2 | 12/2005 | Baek et al. | 711/114 |
| 7,281,160 B2 | 10/2007 | Stewart | 714/8 |
| 7,512,862 B1 | 3/2009 | Taylor | 714/755 |
| 7,640,452 B2 | 12/2009 | Chen et al. | 714/6 |
| 2002/0035669 A1 | 3/2002 | Baek et al. | 711/114 |
| 2003/0041211 A1 * | 2/2003 | Merkey et al. | 711/114 |
| 2004/0059869 A1 | 3/2004 | Orsley | 711/114 |
| 2005/0039069 A1 * | 2/2005 | Prahlad et al. | 714/2 |
| 2006/0077724 A1 * | 4/2006 | Chikusa et al. | 365/189.05 |
| 2006/0206640 A1 * | 9/2006 | Abe | 710/68 |
| 2009/0106492 A1 * | 4/2009 | Muto et al. | 711/114 |
| 2010/0268857 A1 * | 10/2010 | Bauman et al. | 710/74 |
| 2010/0274926 A1 | 10/2010 | Marulkar | 709/247 |

* cited by examiner

*Primary Examiner* — Robert Beausoliel, Jr.
*Assistant Examiner* — Joseph D Manoskey
(74) *Attorney, Agent, or Firm* — Christopher P. Maiorana, PC

(57) ABSTRACT

An apparatus comprising a logically contiguous group of at least three drives, a first loop, a second loop, and a compression/decompression circuit. Each of the drives comprises (i) a first region configured to store compressed data of a previous drive, (ii) a second region configured to store uncompressed data of the drive, (iii) a third region configured to store compressed data of a next drive. The first loop may be connected to the next drive in the logically contiguous group. The second loop may be connected to the previous drive of the logically contiguous group. The compression/decompression circuit may be configured to compress and decompress the data stored on each of the drives.

20 Claims, 9 Drawing Sheets

METHOD TO ESTABLISH REDUNDANCY AND FAULT TOLERANCE BETTER THAN RAID LEVEL 6 WITHOUT USING PARITY

CROSS REFERENCE TO RELATED APPLICATIONS

The present application may relate to co-pending application Ser. No. 12/732,908, filed Mar. 26, 2010, which is hereby incorporated by reference in its entirety.

FIELD OF THE INVENTION

The present invention relates to storage devices generally and, more particularly, to a method and/or apparatus for establishing a level of redundancy and fault tolerance better than RAID level 6 without using parity.

BACKGROUND OF THE INVENTION

Conventional approaches used in RAID (redundant array of inexpensive drives) storage systems are primarily based on either an XOR function (parity calculations) or a mirror function to obtain redundancy and provide fault-tolerance. In RAID 1 and RAID 10 technologies, the drives are mirrored to obtain redundancy. Every time a new write occurs on the media, the entire data needs to be replicated and written onto both a data drive and a corresponding mirrored drive.

Referring to FIG. 1, a RAID 10 approach is shown. The drive DISK0 is shown mirrored to the drive DISK1. The drive DISK2 is shown mirrored to the drive DISK3. RAID 1 and RAID 10 approaches involve mirroring the complete contents of one drive to another drive. If there are two drives configured as RAID 1, where each drive has a capacity C GB, then the total capacity of the RAID group would be C GB (i.e., not the total capacity of both drives of 2 C GB). Hence, the overall storage capacity of a RAID 1 or RAID 10 is 50% of the total capacity of all of the drives in the RAID 1 or RAID 10 configuration.

Referring to FIG. 2, a RAID 4 and a RAID 5 approach are shown. A number of drives DISK0, DISK1, DISK2 and DISK3 are shown. In RAID 4 and RAID 5, the data blocks are striped across a number of the drives DISK0-DISK3 of the RAID group. In the RAID 4 configuration shown, the drives DISK0, DISK1 and DISK2 store data. The parity block is stored in a dedicated drive (i.e., shown as the drive DISK3). In a RAID 5, the parity is distributed across all the drives DISK0-DISK4 in the RAID group. In the RAID 5 configuration shown, the drive DISK3 is shown holding data (compared with a RAID 4 where the drive DISK3 only holds parity).

A D parity (i.e., a parity of the data block D) is stored in the disk DISK0. A C parity is stored on the DISK2. A B parity is shown stored on the disk DISK2. An A parity is shown stored on the disk DISK3.

RAID 4 and RAID 5 approaches use parity generation based on an XOR function. With RAID 4 and RAID 5, every stripe of data is used to generate parity. The parity generated is then stored in another dedicated drive or distributed across all the drives of the RAID group. RAID 4 and RAID 5 can tolerate only one drive failure at a time without losing data.

Referring to FIG. 3, a RAID 6 approach is shown. In a RAID 6 approach, the data blocks A-D are striped across a number of drives (i.e., shown as the drives DISK0-DISK4) of the RAID group. Two parities are calculated. The two parities are then distributed across all the drives in the RAID group. A first of the D parities (i.e., a parity of the data block D) is shown stored on the drive DISK0. A second of the D parities is shown stored on the drive DISK1. The A-C parities are shown similarly distributed on the drives DISK1-DISK4.

The performance of a RAID 6 configuration is less than the performance of a RAID 0, RAID 4 or RAID 5 configuration due to the dual parity generation. The complexity involved during data modification and data writes of a RAID 6 configuration also slows performance. A RAID 6 configuration can only provide a fault-tolerance of up to 2 drive failures without losing data.

It would be desirable to implement a method to establish a higher level of redundancy and fault tolerance than RAID level 6 without increasing the processing overhead of implementing parity.

SUMMARY OF THE INVENTION

The present invention concerns an apparatus comprising a logically contiguous group of at least three drives, a first loop, a second loop, and a compression/decompression circuit. Each of the drives comprises (i) a first region configured to store compressed data of a previous drive, (ii) a second region configured to store uncompressed data of the drive, (iii) a third region configured to store compressed data of a next drive. The first loop may be connected to the next drive in the logically contiguous group. The second loop may be connected to the previous drive of the logically contiguous group. The compression/decompression circuit may be configured to compress and decompress the data stored on each of the drives.

The objects, features and advantages of the present invention include providing a drive storage configuration that may (i) establish a level of redundancy and fault tolerance better than RAID level 6, (ii) be implemented without using parity, (iii) implement an ASIC for Compression/Decompression operations, (iv) use an existing redundant drive channel in a drive enclosure, (v) use drive ports already in use to store data, (vi) provide firmware to implement compression/decompression, (vii) implement firmware to store a mapping between the data blocks of each drive compared to the compressed data block stored in another drive and/or (viii) be cost effective to implement.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
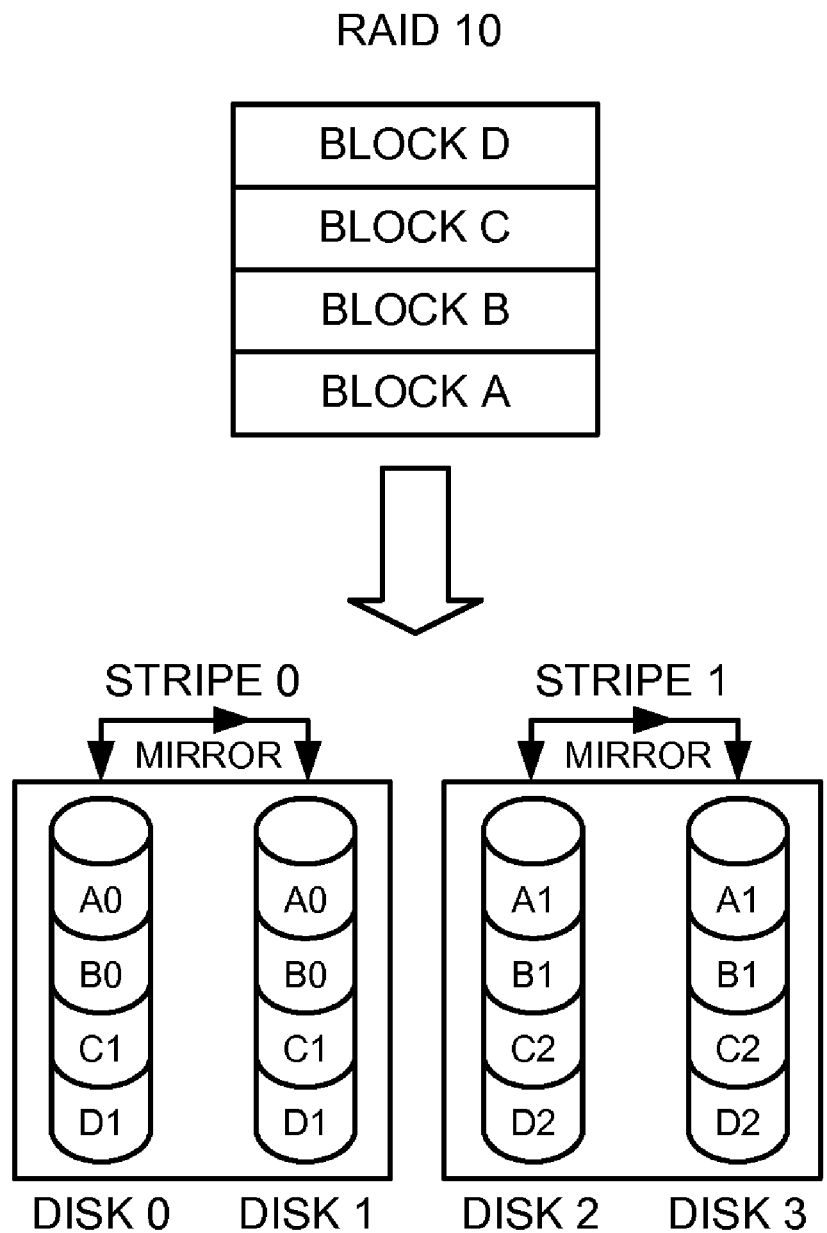
FIG. 1 is a diagram illustrating a RAID 1 and RAID 10 approach.
Figure 2:
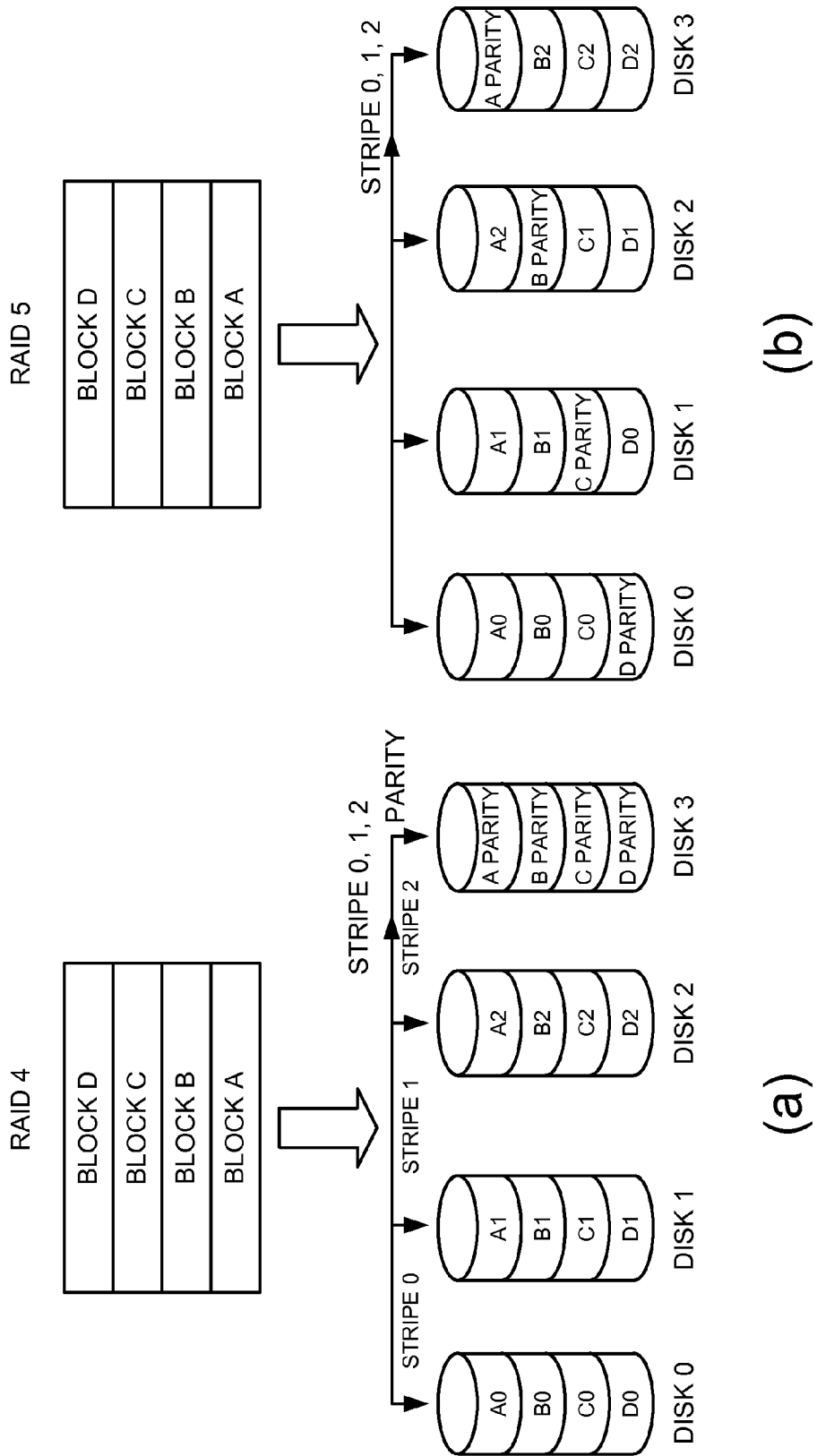
FIG. 2 is a diagram illustrating a RAID 4 and RAID 5 approach.
Figure 3:
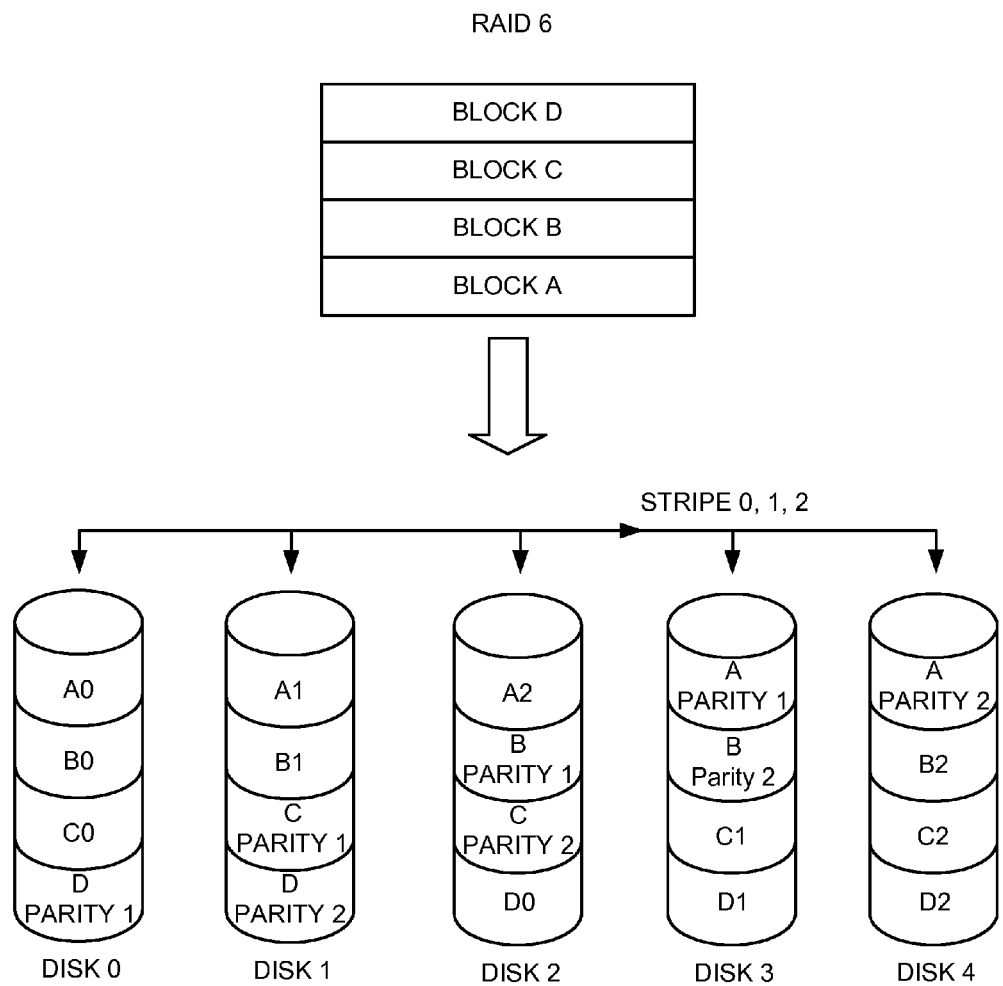
FIG. 3 is a diagram illustrating a RAID 6 approach.

Achieving higher level of redundancy with maximized storage efficiency and performance is a common goal in the modern world of growing data storage. The present invention may implement compression technology to compress a redundant copy of the data in a RAID configuration. The redundant data may be distributed in a dual chained manner. Two logical loops may be implemented to achieve a high level of redundancy and performance in a RAID configuration without the need for parity and/or mirroring techniques. Using compression technology for redundancy provides additional redundancy, better fault tolerance, storage efficiency and/or improved performance. A set of drives may be grouped into a RAID group. The data content of each of the drives may be compressed and stored in two separate drives in the RAID group. A dual chain logical organization may be implemented. A redundant port on the drives and a redundant drive channel in the drive enclosures may be used to provide logical organization.

In a scenario where 50% compression is achieved on the data, the present invention may provide a 50% storage utilization. Such storage utilization may be comparable to a RAID 1. However, with a higher level of compression, the present invention may provide storage efficiency greater than a RAID 1 drive group. For example, the storage efficiency of the present invention may be improved depending on the amount of compression applied to the data. For 50% compression, the storage efficiency of the present invention is generally equal to the storage efficiency of a RAID 1 configuration. For a compression greater than 50%, the storage efficiency achievable by the present invention increases further and generally outperforms the storage efficiency of RAID 4, RAID 5 and/or RAID 6 without any compromise in fault tolerance.

The present invention may provide a fault tolerance of up to a flooring function of 2n/3 drive failures, where n is the number of drives in the system. Fault tolerance better than RAID 4, RAID 5, RAID 6 (and similar variants) may be achieved provided that three logically contiguous drives do not fail (to be discussed in more detail in connection with FIG. 9). In general, no additional read, modify, and/or write operations are needed from the surviving drives in the present invention (as in RAID 5 and RAID 6—due to parity recalculations) thereby enhancing the performance when the system is in a degraded state (e.g., with one or more drive failures).

An ASIC (application specific integrated circuit) may be implemented for compression and/or decompression operations to ensure a specified level of performance for storage subsystems. The use of a dual port drive and/or redundant drive channels in the drive enclosure may ensure such a specified performance for the drives. The dual chained compression solution of the present invention may provide an improved fault-tolerance, redundancy and/or availability to a RAID system.

The RAID group of the present invention may include a collection of drives. An example block of data may be stored in a single drive. A compressed form of the example data from one drive may be stored in two other drives in the same RAID group. These three drives may be referred to as "logically contiguous" drives. The need to use either parity and/or mirroring may be avoided by introducing compression. The compressed data of a particular drive may be stored in two drives in a dual chained manner. For example, two loops may be formed. A high level of redundancy, fault-tolerance and/or performance may be achieved.

Figure 4:
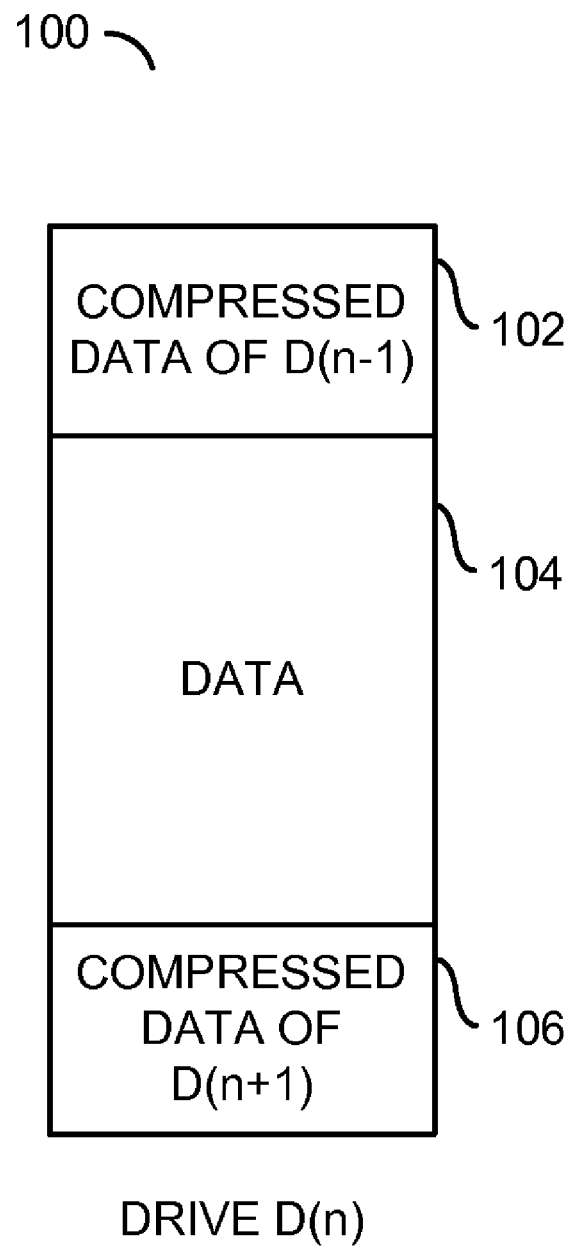
FIG. 4 is a diagram illustrating an example of a drive of the present invention.

Referring to FIG. 4, a drive 100 of the present invention is shown. The drive 100 generally comprises a region 102, a region 104 and a region 106. The region 104 may be used to store uncompressed data. The region 102 may be used to store compressed data of one logically contiguous drive (e.g., the compressed data from the drive n−1). The region 106 may be used to store compressed data of the another logically contiguous drive (e.g., the compressed data from the drive n+1).

The particular compression mechanism implemented may involve a one-to-two mapping of the actual contents of the drive 100 (to be described in more detail in connection with FIG. 5). For example, a compressed version of the data of one drive may be stored on two other logically contiguous drives. Mapping information may be maintained by embedded firmware on a controller. The mapping information may be used to reconstruct the data of the drive in the event of a drive failure and/or error correction by decompressing the compressed data block from one of the logically contiguous drive. When replacing the failed drive with a new properly performing drive, the data of the failed drive can be reconstructed in the new drive by decompressing the compressed data block from one of the logically contiguous drives. The mapping information may be implemented by the controller firmware embedded on each of the redundant storage array controllers (to be described in more detail in connection with FIG. 6).

Figure 5:
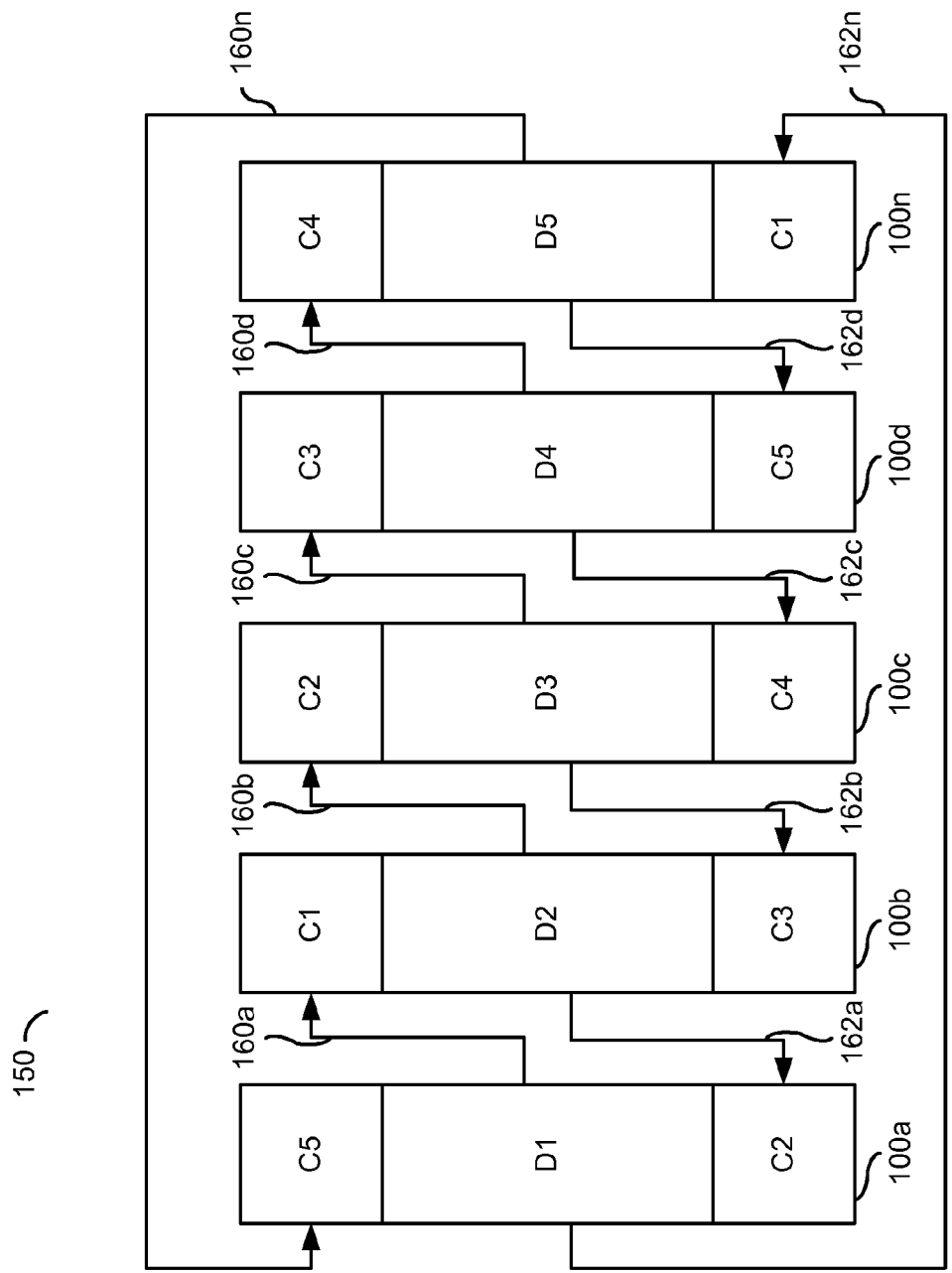
FIG. 5 is a diagram illustrating a number of drives in a dual chained two logical loop configuration.

Referring to FIG. 5, a block diagram of a drive system (or configuration) 150 is shown. The system 150 generally comprises a number of drives 100a-100n. The particular number of drives 100a-100n may be varied to meet the design criteria of a particular implementation. Each of the drives 100a-100n may have a data section (e.g., D1-D5), a compression section (e.g., C1-C5) and a compression section (e.g., C1-C5). For example, the drive 100a may have a data section configured to store an uncompressed data D1. A compressed form of the data blocks D1 may be stored in two logically contiguous drives as data C1. For example, the compressed data C1 may be stored in the drive 100b and the drive 100n. The drives 100a-100n may form a loop 160a-160n and a loop 162a-162n. The loop 160a-160n and the loop 162a-162n may form two dual chained logical loops. In general, the loop 160a-160n may be implemented as a number of logical connections between the drives 100a-100n. For example, a portion 160a may logically connect the data D1 of the drive 100a to the compressed data C1 of the drive 100b. The loop 160a-160n is shown in a generally left to right manner. The loop 162a-162n has a similar implementation in a generally right to left implementation. For example, the portion 162d may logically connect the data D5 of the drive 100n to the compressed data C5 of the drive 100d. The particular arrangement of the loop 160a-160n and the loop 162a-162n may be varied to meet the design criteria of a particular implementation.

In the example shown, the drive 100b may store data D2. A compressed version of the data D2 may be stored on the drive 100c as the data C2, accessible through a portion 160b of the logical loop 160a-160n. The data C2 may also be stored on the drive 100a, accessible through a portion 162a of the logical loop 162a-162n. Similarly, the data D1 of drive 100a may have a compressed version of the D1 data stored as the data C1 on the drive 100n and the drive 100b. The compressed data C5 of the drive 100n may be stored in the drive 100a and the drive 100d. In general, any three of the drives 100a-100n may form a logically contiguous group. In one example, the drives 100b, 100c and 100d may be a logically contiguous group. A logically contiguous group may be formed by drives that are not shown adjacent to each other. The data D3 of the drive 100c is shown stored in both the drive 100b and the drive 100d as compressed data C3.

Figure 6:
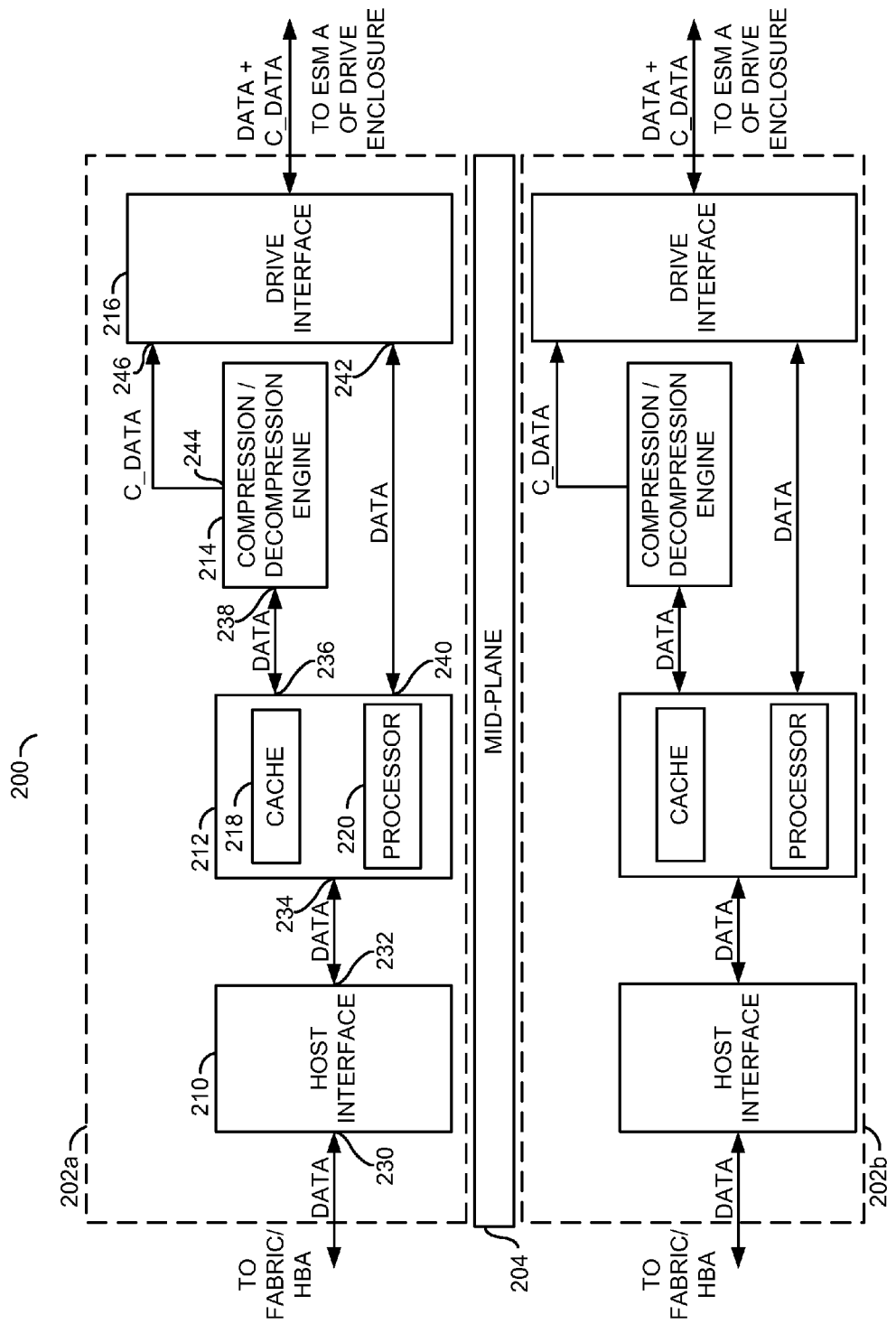
FIG. 6 is a diagram illustrating dedicated logic for compression/decompression operations.

Referring to FIG. 6, a diagram of a storage subsystem 200 is shown. The subsystem 200 generally comprises a number of blocks (or circuits) 202a-202b. The circuits 202a-202b may each be implemented as compression/decompression circuits. A mid-plane 204 may be implemented between the circuit 202a and the circuit 202b. The compression circuit 202a generally comprises a block (or circuit) 210, a block (or circuit) 212, a block (or circuit) 214 and a block (or circuit) 216. The circuit 210 may be implemented as a host interface. The circuit 212 may be implemented as a processor along with a data cache. The circuit 214 may be implemented as a compression/decompression engine. The circuit 216 may be implemented as a drive interface. The circuit 212 generally comprises a cache circuit 218 and a processor circuit 220. The host interface 210 may have an input 230 that may receive a signal (e.g., DATA). The signal DATA generally represents one or more data blocks (or packets) representing the data D1-D5 described in FIG. 5. The host interface may have an output 232 that may present the signal DATA to an input 234 of the circuit 212. The circuit 212 may have an output 236 that may present the signal DATA to an input 238 of the circuit 214. The circuit 212 may also have an output 240 that may present the signal DATA to the input 242 of the circuit 216. The circuit 214 may have an output 244 that may present a signal (e.g., C_DATA) to an input 246 of the circuit 216. The signal C_DATA may be a compressed version of the signal DATA. The signal C_DATA generally represents one or more data blocks (or packets) representing the compressed data C1-C5 described in FIG. 5. The circuit 202b may have a similar implementation. The circuit 214 may provide a dedicated logic to implement the compression and/or decompression operations.

The logic of the circuit 202a and/or circuit 202b may be either embedded in the code running as a part of the controller firmware along with code for the RAID engine, or may be offloaded to an ASIC controlled and operated by the controller firmware code. Offloading the code may increase the performance at the cost of additional circuitry. The particular type of compression/decompression implemented by the circuit 214 may be varied to meet the design criteria of a particular implementation. The circuit 202a and/or the circuit 202b may be used for redundancy, fault tolerance and/or RAID group failover mechanisms.

Figure 7:
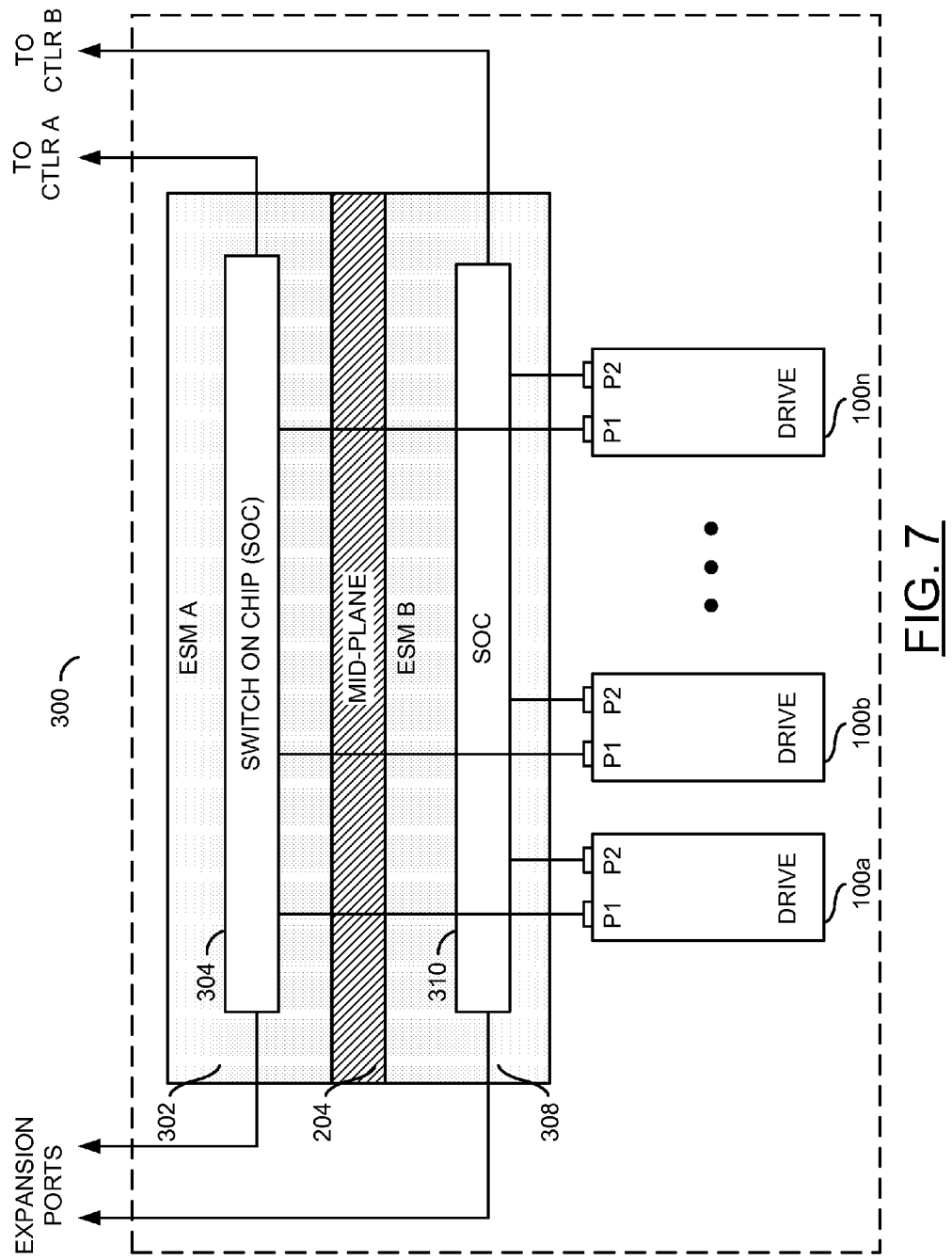
FIG. 7 is a diagram illustrating a drive enclosure.

Referring to FIG. 7, a drive enclosure 300 is shown. The drive enclosure 300 is shown including a number of the drives 100a-100n. Each of the drives 100a-100n is shown having a port (e.g., P1) and another port (e.g., P2). The enclosure generally comprises a circuit 302, a circuit 304, a mid-plane 204, a circuit 308, and a circuit 310. The circuit 302 may be implemented as a primary ESM. The circuit 308 may be implemented as a alternate ESM. One of the ports P1 and P2 of each of the drives 100a-100n may be a primary port. One of the other ports P1 and P2 of each of the drives 100a-100n may be a secondary port. The I/O paths of the uncompressed data D1-D5 and the compressed data C1-C5 onto the drives may be kept separate. Both the uncompressed data D1-D5 and the compressed data C1-C5 are handled by the same controller. The drives 100a-100n may be implemented as dual port drives to implement redundancy (e.g., to store and the retrieve compressed data C1-C5 on the drives 100a-100n). The SOC 304 (or 310) may be resident in an ESM 302 (or 308) and may perform the switching/routing of data onto the drives 100a-100n. The mid plane 204 on the drive enclosure 300 may be used to send compressed data to the redundant ESM 302 (or 308) of the drive enclosure 300. The mid plane 204 may also be used to send compressed data to a drive 100a-100n using the secondary port P2.

The compressed data C_DATA of the signal DATA may be routed over the mid-plane circuit 204 in the drive enclosure 300 onto the alternate ESM 308 keeping the data D1-D5 with the same ESM. For a RAID logical drive owned by the controller 202a, the primary port P1 of each of the drives 100a-100n may be used to transfer uncompressed data over the primary channel handled by the ESM 302. The secondary port P2 of each of the drives 100a-100n may be used to transfer compressed data over the secondary channel handled by ESM 308. For a RAID logical drive 100a-100n owned by the controller 202b, the port P2 may be used as a primary port to transfer uncompressed data over the primary channel handled by the ESM B 308. The port P1 may be used as a secondary port to transfer compressed data over the secondary channel handled by the ESM 302.

A RAID group implemented using the present invention may have the actual (uncompressed) data D1-Dn stored in one of the drives 100a-100n and compressed data C1-Cn stored in two other logically contiguous drives 100a-100n. On arrival of each data segment from a host, the data D1-D5 is split into multiple stripes to be sent to the drive interface 216. Parallel to this process, the striped data is compressed by the compression engine sent to the drive interface. The actual data D1-Dn along with the compressed data C1-Cn is sent to the drive enclosure 300.

Figure 8:
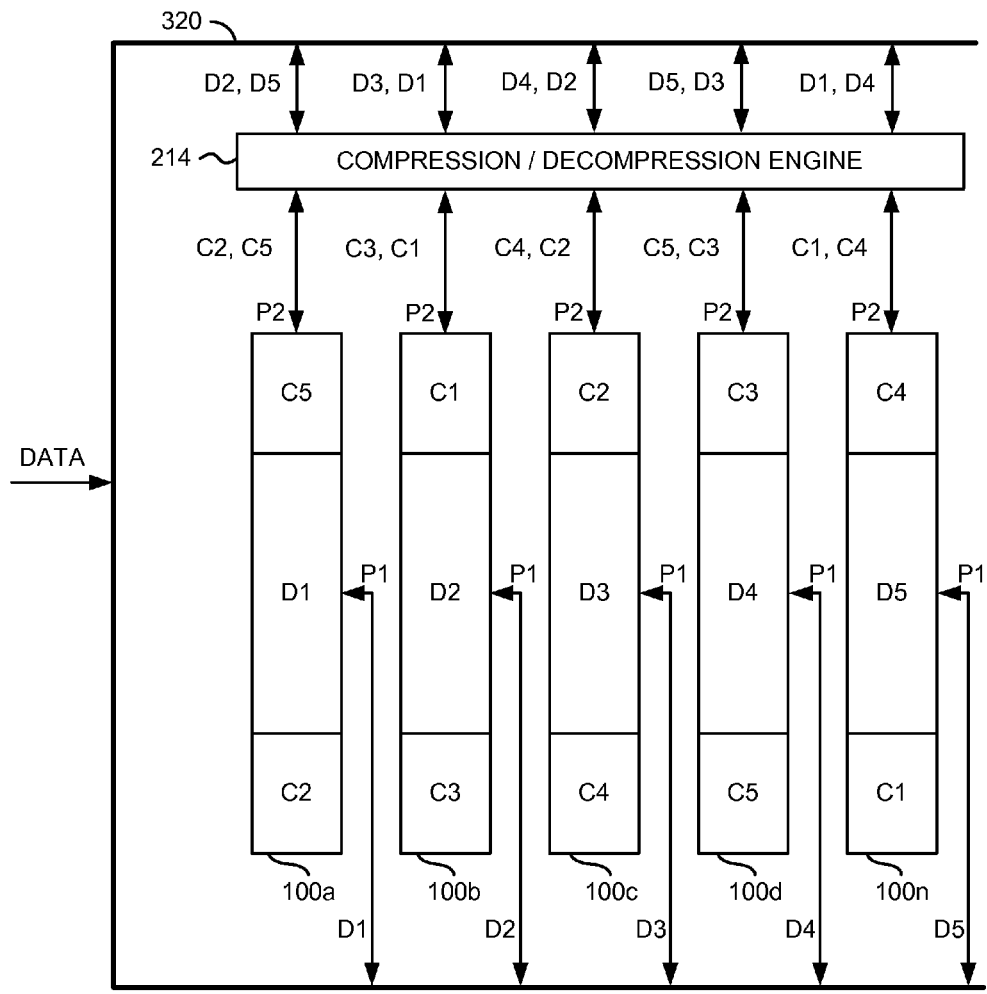
FIG. 8 is a diagram illustrating an example of data flow to the drives.

Referring to FIG. 8, an example of data flow to the drives 100a-100n is shown. Data may be sent on a data channel 320. Each of the drives 100a-100n may receive data on the primary port P1 from the data channel 320. The data from the data channel 320 may be compressed by the compression/decompression engine 214. Each of the drives 100a-100n may receive compressed data on the secondary port P2 from the compression/decompression engine 214. This ensures that the RAID group works with any number of drives 100a-100n without loss of drive performance. The present invention normally provides a fault-tolerance of 2n/3 drives, where n is the total number of drives in the RAID group provided that there are not three logically contiguous drive failures.

Using 50% data compression with the present invention will ensure the same storage efficiency and greater performance compared to a RAID 1 implementation. Consider a 4 drive example. If each of the drives 100a-100n has a capacity C GB, then the maximum space occupied with a RAID 1 is 2 C GB. However, with the present invention, the data region in each of the drives 100a-100n occupies 0.5 C GB and the two compression regions occupy 0.5 C GB (50% compression). Hence, in 4 drives the total capacity of actual data that the RAID group can store is 2 C GB. The performance is greater since the drives 100a-100n may be accessed like a RAID 0 group with data striped across both the drives. Therefore, the present invention may provide storage efficiency equal to RAID 1 with compression equal to 50%. Also, the present invention may provide performance and storage efficiency greater than RAID 1 with a compression greater than 50%. However, by implementing compression greater than 50%, the storage capacity efficiency of the drives 1001-100n may be further improved.

The present invention is generally more fault tolerant than the RAID 4, RAID 5 and RAID 6 implementations since the present invention may continue to operate without data loss if more than 2 drives fail (up to 2n/3 drives provided no 3 logically contiguous drives fail). Additional fault tolerance may be implemented compared with RAID 3, RAID 5 and RAID 6 groups. In the case of the RAID 3, RAID 5 and RAID 6 groups, whenever a modify operation is implemented on the group, all the drives need to be read to recalculate the parity and update the parity along with the modified data. With the present invention, for every modify operation, the data is striped and written to the respective drives 100a-100n. The compression of the stripes are then independently generated and written onto the logically contiguous drives in the RAID group. Fewer reads and/or updates are needed compared with the parity generation methods.

Figure 9:
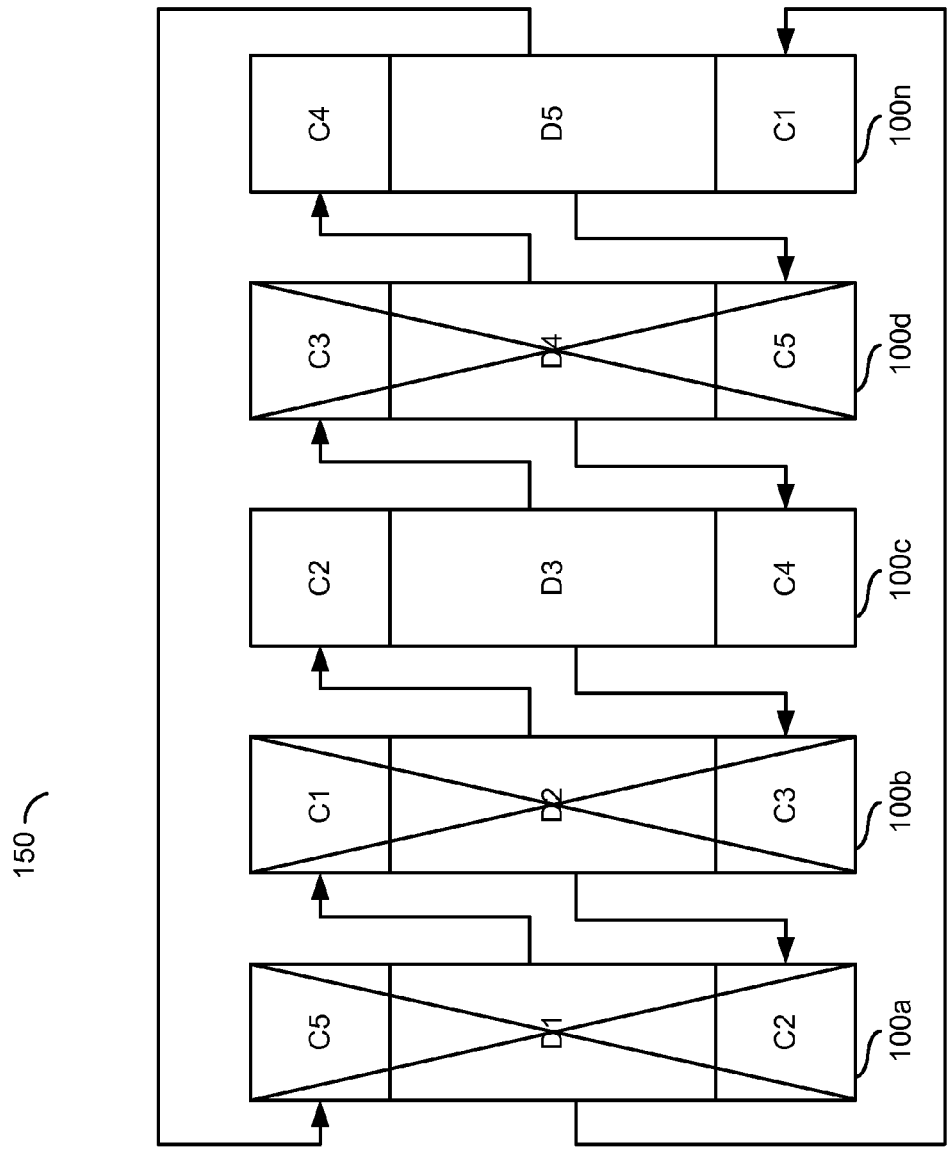
FIG. 9 is a diagram illustrating an example of a three drive failure.

Referring to FIG. 9, a diagram illustrating the drive system 150 with 3 drive failures is shown. The drive system 150 may handle a multiple drive loss scenario, so long as all of the drives that fail are non-contiguous. The drive 100a, the drive 100b and the drive 100d are marked with an X to show drive failures. Even with three drives failing, all the data will continue to be available. The following TABLE 1 describes the state of each drive and the data availability:

TABLE 1

| Drive | State | Data Availability |
| --- | --- | --- |
| 1 | Failed | Through C1 in Drive 5 |
| 2 | Failed | Through C2 in Drive 3 |
| 3 | Optimal | Through D3 |
| 4 | Failed | Through C4 in Drive 3 or 5 |
| 5 | Optimal | Through D5 |

A similar failure using a RAID 6 approach would result in the failure of the entire RAID group. Therefore, the present invention provides greater fault tolerance than a RAID 6 approach.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a logically contiguous group of at least three drives, wherein each of the drives comprises (i) a first region configured to store compressed data of a previous drive, (ii) a second region configured to store uncompressed data of said drive, (iii) a third region configured to store compressed data of a next drive, (iv) a first port configured to transfer said uncompressed data to a drive controller, and (v) a second port configured to transfer said compressed data between said drives;
   a first loop connected to said next drive of said logically contiguous group;
   a second loop connected to said previous drive of said logically contiguous group; and
   a compression/decompression circuit configured to compress and decompress the compressed and uncompressed data stored on each of said drives prior to transferring said compressed data through said second port, wherein said uncompressed data for one of said drives is stored as compressed data on at least two other of said drives.

2. The apparatus according to claim 1, wherein said second region of one of said drives in said logically contiguous group is connected to said first region of said next drive.

3. The apparatus according to claim 1, wherein said second region of one of said drives in said logically contiguous group is connected to said third region of said previous drive.

4. The apparatus according to claim 1, wherein a portion of said first loop connects said second region of one of said drives to said first region of said previous drive.

5. The apparatus according to claim 1, wherein a portion of said second loop connects said second region of one of said drives to said third region of said next drive.

6. The apparatus according to claim 1, wherein compressed data of said first region of one of said drives is accessible through a portion of said first loop.

7. The apparatus according to claim 1, wherein compressed data of said third region of one of said drives is accessible through a portion of said second loop.

8. The apparatus according to claim 1, wherein mapping information is maintained by firmware (i) embedded on a storage array controller, and (ii) used to reconstruct data of the drive in the event of a drive failure and/or error correction, and (iii) implemented in parallel with said transferring said uncompressed data.

9. The apparatus according to claim 1, wherein the dedicated logic of said compression/decompression circuit is embedded in a controller firmware RAID engine code.

10. The apparatus according to claim 1, wherein the dedicated logic of said compression/decompression circuit is transferred to an ASIC peripheral device.

11. The apparatus according to claim 1, wherein each of said second ports of said drives is dedicated to store and retrieve said compressed data.

12. The apparatus according to claim 1, wherein each of said second ports of said drives comprises a redundant drive channel used in addition to said first ports used to transfer said uncompressed data.

13. The apparatus according to claim 1, wherein said apparatus establishes redundancy and fault tolerance without using parity.

14. The apparatus according to claim 1, wherein said apparatus provides fault tolerance up to 2n/3 drive failures, where n is the number of drives.

15. An apparatus comprising:
   means for implementing a logically contiguous group of at least three drives, wherein each of the drives comprises (i) a first region configured to store compressed data of a previous drive, (ii) a second region configured to store uncompressed data of said drive, (iii) a third region configured to store compressed data of a next drive, (iv) a first port configured to transfer said uncompressed data to a drive controller, and (v) a second port configured to transfer said compressed data between said drives;
   means for implementing a first loop connected to said next drive of said logically contiguous group;
   means for implementing a second loop connected to said previous drive of said logically contiguous group; and
   means for implementing a compression/decompression circuit configured to compress and decompress the compressed and uncompressed data stored on each of said drives prior to transferring said compressed data through said second port, wherein said uncompressed data for one of said drives is stored as compressed data on at least two other of said drives.

16. The apparatus according to claim 15, wherein said apparatus establishes redundancy and fault tolerance without using parity.

17. The apparatus according to claim 15, wherein said apparatus provides fault tolerance up to 2n/3 drive failures, where n is the number of drives.

18. A method for implementing fault tolerance in a drive array comprising the steps of:
   (A) implementing a logically contiguous group of at least three drives, wherein each of the drives comprises (i) a first region configured to store compressed data of a previous drive, (ii) a second region configured to store uncompressed data of said drive, (iii) a third region configured to store compressed data of a next drive, (iv)

a first port configured to transfer said uncompressed data to a drive controller, and (v) a second port configured to transfer said compressed data between said drives;

(B) implementing a first loop connected to said next drive of said logically contiguous group;

(C) implementing a second loop connected to said previous drive of said logically contiguous group; and (D) implementing a compression/decompression circuit configured to compress and decompress the compressed and uncompressed data stored on each of said drives prior to transferring said compressed data through said second port, wherein said uncompressed data for one of said drives is stored as compressed data on at least two other of said drives.

19. The method according to claim 18, wherein said method establishes redundancy and fault tolerance without using parity.

20. The method according to claim 18, wherein said apparatus provides fault tolerance up to 2n/3 drive failures, where n is the number of drives in the array.

* * * * *